Figure 1:
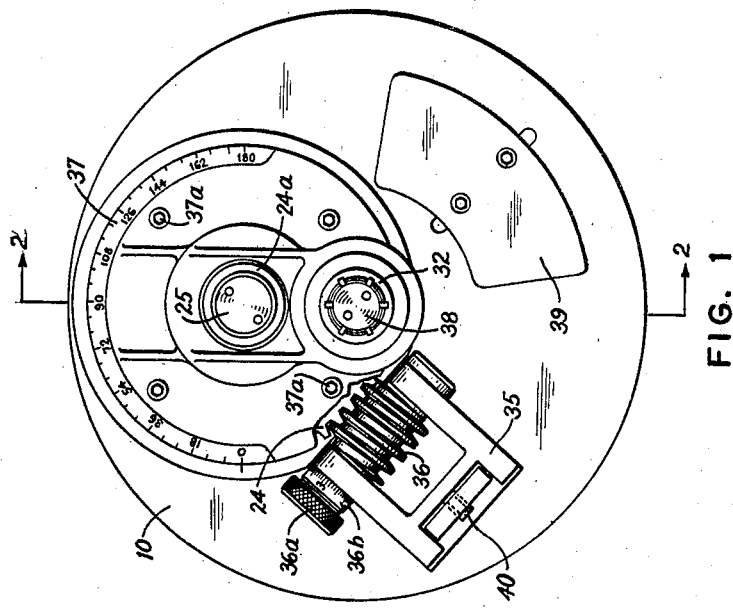

April 25, 1944.  H. M. LAXER  2,347,489
ATTACHMENT FOR MACHINE TOOLS
Filed Oct. 10, 1942

INVENTOR.
Harry M. Laxer
BY
ATTORNEY

Patented Apr. 25, 1944

2,347,489

UNITED STATES PATENT OFFICE 2,347,489

ATTACHMENT FOR MACHINE TOOLS

Harry M. Laxer, Jersey City, N. J., assignor, by mesne assignments, to Reconstruction Finance Corporation, New York, N. Y., a corporation of the United States Application October 10, 1942, Serial No. 461,610

5 Claims. (Cl. 90—15)

This invention relates generally to machine tools and is more particularly directed to an attachment for lathes and other machine tools to which my invention may be applicable, for converting a lathe or other machine tool to function in the performance of certain milling operations, customarily performed by specially designed thread-milling machines, as in cutting threads, grooves, slots and the like on or in solid or hollow pieces of work.

The primary object of this invention is to provide a simple and highly efficient attachment for lathes, whereby a lathe may be employed in performing various circular milling operations, on regular or irregular shaped work, thereby materially reducing equipment and maintenance costs and rendering it possible to attain faster and more economical production of many articles, in the manufacture of which turning and threading operations may be involved.

Another important object of this invention is to simplify certain operations that are now performed on standard type milling machines, such as the milling or cutting of internal and external threads, the complicated adjustments that are essential to condition a milling machine for performing a given piece of work, as cutting an internal thread, my aforementioned attachment being readily applied to a standard hollow spindle lathe to function in the required operation on the work of any shape supported in the carriage thereof, in response to simple adjustments of cooperating elements thereof, which may be quickly and accurately effected, even by a workman unskilled in milling machine setting up operations.

It is also an object of my invention to provide an attachment for certain machine tools, as aforesaid, to perform specific operations for which a thread-milling machine is now required, which may be variously adjusted, relative to the head stock spindle of a lathe, for example, to engage the work presented to the cutting element of my attachment, as centered in alinement with the axis of the lathe spindle, or at different degrees of relative angularity, as may be requisite to the particular job in hand; the relatively adjustable elements of my attachment being adapted to function in their various positions of adjustment in a manner to insure absolute precision in the performance of the milling operation for which the attachment and the work have been set up.

Other objects and advantages flowing from the practicing of my invention will become manifest as the description proceeds.

For the purposes of this disclosure, I have elected to present a preferred embodiment of my invention in the accompanying drawing, as it may be used in association with a standard type of lathe having a hollow spindle. However, my invention may be equally advantageously employed with other machine tools, operating in a horizontal or vertical plane and the structural details thereof may be varied as required to meet operational and production requirements, within the spirit and scope hereof.

Figure 2:
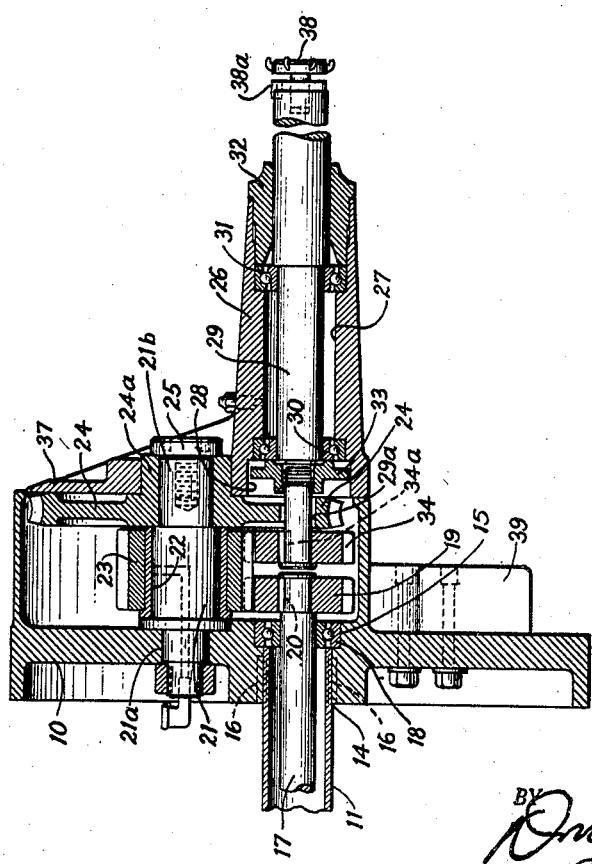

In the drawing:

Figure 1 is a front elevation of a milling attachment, conforming to my invention, as associated with the head stock spindle of a standard lathe; and Figure 2 is a longitudinal cross-section on the line 2—2 of Figure 1.

Referring now to the drawing in detail, in which like characters of reference are employed to designate similar parts in the several views, a face plate 10 which is adapted to be substituted for the lathe face plate, is mounted in keyed engagement with the hollow spindle 11 of the head stock of the lathe (not shown) the lathe spindle 11 being driven by a belt traversing one or another of the pulleys (not shown) in a conventional overhead shaft-driven set up of the lathe.

As will be observed from Figure 2 of the drawing, the face plate 10 is centrally bored and counterbored, as at 14, 15, for keying to the lathe spindle, as at 16, and for the reception of the cutter drive shaft 17 rotating in the antifriction bearing 18, within the base of said face plate. At its outer end, said shaft carries a gear 19, keyed thereto, as at 20, said shaft extending through the hollow spindle 11 of the lathe to be driven independently thereof, as by an electric motor, or other driving means (not shown).

Disposed transversely of the face plate 10, above and in parallel relation to the axis of the aforesaid drive shaft 17 of the attachment, is a stud 21 fixed in the base of the face plate, as at 21a, a sleeve 22 embracing said stud 21, forming a bearing for the stud gear 23 which is rotatable upon said sleeve.

A forward extension 21b of said stud 21 serves as a mounting for a worm gear 24, a retaining screw 25, entered in said stud extension 21b with its head in abutment with the hub 24a of said worm gear 24 completing the connection of the work gear to said stud extension for relative rotative movement, as and for the purpose hereinafter described.

From the foregoing, it will be manifest that the worm gear 24, carried by the stud extension 21b, is rotatable relative to the face plate from which the stud 21 is fixedly supported.

Integral with the hub portion 24a of the worm gear 24 or otherwise fixed to the worm gear for movement therewith, is a spindle 26, bored and counterbored, as at 27, 28, to receive the cutting tool shaft 29 rotating in the anti-friction bearings 30, 31 and the tapered adjustable bearing 32 at the outer end of said spindle 26, an adjustment nut 33 being associated with the anti-friction bearing 30. At its inner end, said cutting tool shaft 29 is provided with a gear 34, keyed thereto, as at 34a, in mesh with the stud gear 23, with which the aforesaid gear 19 keyed to the tool drive shaft 17 is also engaged, said tool shaft 29 extending through an opening 29a in said worm gear 24, between the gear 34 and the adjustment nut 33, as clearly shown in Figure 2. As will be apparent, the three gears 19, 23 and 34 constitute a train through which the torque of the shaft 17 is transmitted to the tool-carrying shaft 29, it being obvious that the driving effort transmitted to the stud gear 23 by the gear 19 will be effective to drive the tool shaft gear 34, said stud gear 23 functioning as an idler in constant mesh with the two shaft gears.

Fixed to said face plate 10, to the left and below the axis of the worm gear 24, is a mounting 35 for an adjusting screw or worm 36 in mesh with said worm gear 24, said adjusting screw being manually actuatable by means of the knurled head 36a, to rotate said worm gear 24 on the axis of the longitudinal extension 21b of the stud 21, as described. A dial 37, mounted on said worm gear 24, as at 37a, is calibrated in degrees, as shown from 0 to 180, the cutting tool shaft 29 being rotatable with said worm gear 24, on the axis of the stud extension 21b, through an arc of 180°, as will be explained, the neck of the adjusting screw 36 embodying a dial, indicated at 36b, graduated to 3' of the arc of movement of the tool shaft. A counterweight 39 is adjustably mounted on face plate 10 to compensate for the off-set load of the adjusting worm 36, and the equal loads of the adjusting worm and counterweight, counterbalance the worm gear assembly above the axis of the spindle 11 to eliminate whip in the rotation of the face plate.

From the preceding description, it will be evident that the face plate 10 rotates on the axis of the lathe spindle 11, the concentric relationship of the spindle 11 and the tool drive shaft 17 being at all times maintained, in the functioning of my attachment, the torque of the drive shaft 17, being transmitted to the tool shaft 29 to rotate the latter at the tool drive shaft speed, through the gear train, as pointed out. However, since the tool shaft is supported from the worm gear 24, for rotation therewith on the axis of the stud 21 and relative to the face plate 10, to which said stud is fixed, it also will be apparent that the tool shaft 29 may be actuated to a position eccentric to the tool drive shaft 17, with which it is normally alined, as shown in Figure 2, by the manipulation of the adjusting screw or worm 36 and the resultant actuation of the worm gear 24, with which said adjusting worm is in constant mesh, the adjusting worm being locked by radial cramping pressure applied by means of screw 40, when the requisite rotative movement of the worm gear 24 has been effected, as indicated by the dial 37 in conjunction with the dial 36b associated with the adjustment screw or worm 36.

With the tool shaft 29 adjusted to a position eccentric of the tool drive shaft 17, concentric with the lathe spindle 11, in the amount necessary for the performance of a given piece of work, the appropriate cutting tool, indicated at 38, keyed to the tool shaft 29, as at 38a, will be disposed relative to the work for operating internally or externally thereof, as the case may be, the work being supported on the carriage of the lathe (not shown), which is fed toward the cutting tool 38 and the lathe spindle 11, by the usual feed screw with which such holder is engaged. Obviously, other media for feeding the work toward the tool 38 may be employed.

Let us assume that, in operation, the tool shaft 29 has been moved through an arc of say 10°, in the clockwise rotation of said worm gear 24, by the manipulation of said adjustment screw 36, to locate the cutting tool 38 fixed to the end of said shaft 29 in position to traverse the outer periphery of the work, as presented to said tool in the movement of the work-carrying means toward the tool, the work being alined with the rotating tool drive shaft concentric with the lathe spindle 11, as explained. Since the face plate 10 and the tool drive shaft 17 revolve on a common axis of rotation, but at different speeds, it will be apparent that the tool shaft 29 eccentrically offset, parallel to the axis of the drive shaft 17, will travel in a planetary path about the axis of the work, with the cutting tool 38 in contact with the outer periphery of the work, as desired. If the cutting tool is to operate internally of the work, the orbit of movement of the tool shaft 29 about the axis of the tool drive shaft 17 is gauged accordingly by the adjustment of the worm wheel 24, to bring the cutting tool 38 into cutting engagement with the inner periphery of the work, as will be readily understood from this disclosure. In grooving or other operations which may be performed by the appropriate cutting tool, operating with my attachment, the elements of my attachment mechanism function as described in the thread-cutting operation.

When the thread-forming operation has been completed, the angular adjustment of the cutting tool shaft 29 may be decreased or increased depending upon whether an interior or exterior thread is being formed, so that the cutting tool 38 is out of contact with the formed threads as the work is withdrawn.

As will be manifest, I have devised a highly practical and efficient attachment of a durable construction, which may be used in converting a lathe or other machine tool to which it may be applied for the performance of a number of different operations which can now only be performed in part on thread-milling machines and which require special knowledge of the setting up requirements of such machines, if any degree of accuracy is to be attained, whereas, with my attachment, the necessary tool setting may be made and the work turned out by an average mechanic, with the same precision, and in some instances, greater precision, than in an equivalent milling machine operation.

I claim:

1. A milling attachment for a lathe including a face plate adapted to be keyed to the hollow head stock spindle of a lathe, a drive shaft rotatable within said face plate driven independently of said lathe drive, a worm gear mounted above said shaft rotatable within said face plate, for rotative movement relative to said face plate, a second shaft supported from said worm gear and extending therethrough within the area of said face plate, a gear train, including gears on the adjacent ends of said two shafts and an idler in mesh with said two gears for transmitting motion from said drive shaft to said second shaft, the two shafts rotating at the same speed, and means for manually rotating said worm gear relative to said face plate to locate said second shaft in a position eccentric to said drive shaft, whereby in the revolution of said face plate with said lathe spindle, said second shaft will revolve in a planetary path about the axis of said drive shaft, said second shaft being adapted to receive a cutting tool to perform a milling operation upon a piece of work supported upon the lathe for advancement to said tool for traversing engagement thereby.

2. A milling attachment for a lathe including a face plate adapted to be keyed to the hollow head stock spindle of a lathe, a drive shaft rotatable within said face plate driven independently of said lathe drive, a worm gear mounted above said shaft rotatable within said face plate, for rotative movement relative to said face plate, a second shaft supported from said worm gear and extending therethrough within the area of said face plate, a gear train, including gears on the adjacent ends of said two shafts and an idler in mesh with said two gears for transmitting motion from said drive shaft to said second shaft, the two shafts rotating at the same speed, a worm mounted on said face plate in mesh with said worm gear and means for actuating said worm to rotate said worm gear relative to said face plate to dispose said second shaft in a position eccentric of said drive shaft with its axis parallel to that of said drive shaft, whereby in the revolution of said face plate with said lathe spindle, said second shaft will revolve in a planetary path about the axis of said drive shaft, said second shaft being driven from said drive shaft, and a cutting tool associated with said second shaft and moving in such planetary path therewith to perform a milling operation upon a piece of work supported upon the lathe and advanced toward said tool for traversing engagement thereby.

3. A milling attachment for a lathe, including a face plate adapted to be keyed to the hollow head stock spindle of a lathe, a drive shaft rotatably mounted within said face plate and extending through the spindle of the lathe for connection to means for driving said shaft independently of the spindle drive of said lathe, a worm gear mounted above said drive shaft for arcuate rotative movement relative to said face plate, a second shaft adapted to receive a cutting tool supported from said worm gear for conjoint arcuate movement, gearing for transmitting the torque from said drive shaft to said second shaft, including an idler gear carried by said face plate, said second shaft being adapted to operate at the speed of the driving shaft, a worm mounted on said face plate in mesh with said worm gear and means for manually adjusting said worm to effect arcuate movement of said worm gear relative to said face plate to locate said second shaft in a predetermined position eccentric to said drive shaft, with the axes of the two shafts in parallelism, whereby in the revolution of said face plate with the lathe spindle said second shaft will rotate with said face plate in a planetary path about the axis of rotation of said face plate, to cause a tool carried by said second shaft to traverse a piece of work supported upon the lathe and advanced toward said tool for engagement by such tool.

4. A milling attachment for a lathe, including a face plate adapted to be keyed to the hollow head stock spindle of a lathe, a drive shaft rotatably mounted within said face plate and extending through the spindle of the lathe for connection to means for driving said shaft independently of the spindle drive of said lathe, a worm gear mounted above said drive shaft for arcuate rotative movement relative to said face plate, a second shaft adapted to receive a cutting tool supported from said worm gear for conjoint arcuate movement, gearing for transmitting the torque from said drive shaft to said second shaft, including an idler gear carried by said face plate, said second shaft being adapted to operate at the speed of the driving shaft, a dial carried by said worm gear, a worm mounted on said face plate in mesh with said worm gear, a dial associated with said worm and means for manually rotating said worm to effect arcuate rotative movement of said worm gear relative to said face plate, to locate said second shaft in a position predetermined by the relative movements of said worm and said worm gear eccentric to the axis of rotation of said face plate and parallel thereto, whereby said second shaft will rotate with said face plate about the axis of rotation of said face plate in radially spaced relation thereto, to cause a tool carried by said second shaft to traverse a peripheral surface of a piece of work supported upon the lathe and advanced toward said tool in centered relation to the axis of said spindle.

5. A milling attachment for lathes, including a face plate conformed for connection to the hollow spindle of the head stock of a lathe for revolution therewith, a drive shaft having bearings on said face plate adapted to be driven by means independent of the lathe spindle drive, a worm gear mounted on said face plate for relative arcuate rotative movement, a second shaft formed to receive a cutting tool carried by said worm gear for conjoint arcuate movement relative to the axis of rotation of the lathe spindle, means for driving said second shaft from said drive shaft, and means carried by said face plate and rotatable relative thereto effective on said worm gear to arcuately actuate said worm gear relative to said face plate, the movement of said second shaft with said worm gear locating said second shaft for rotation with said face plate in radially spaced relation to the axis of a piece of work centered on the axis of said lathe spindle, whereby a cutting tool carried by said second shaft will traverse an inner or outer peripheral surface of the work, as may be predetermined by the arcuate movement of said worm gear, relative to the face plate.

HARRY M. LAXER.